May 24, 1960 K. A. STRZALA 2,937,749
ARTICLE GAUGING AND SELECTING APPARATUS
Filed Dec. 19, 1956 5 Sheets-Sheet 1
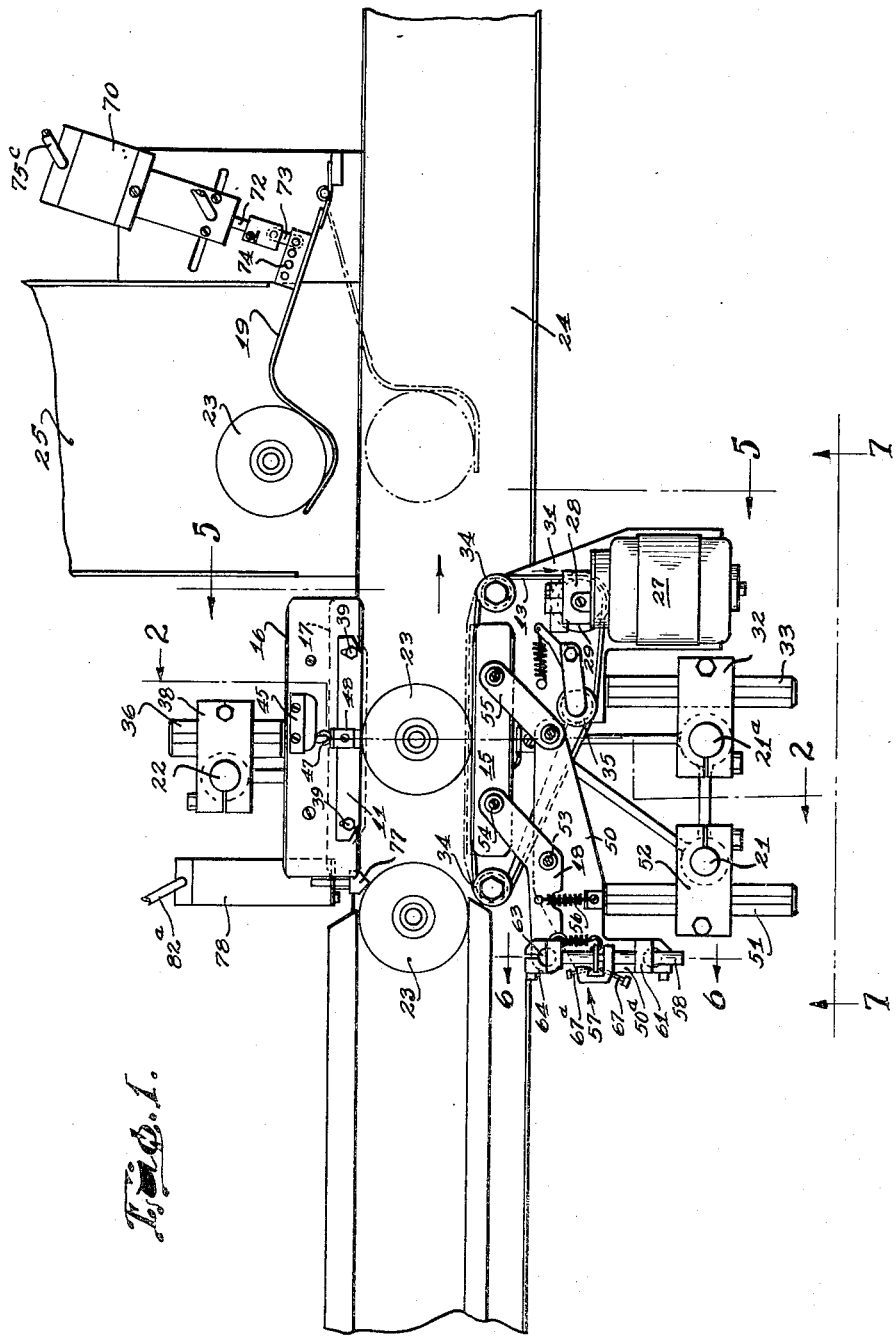
INVENTOR
KAZIMER A. STRZALA
BY
ATTORNEYS

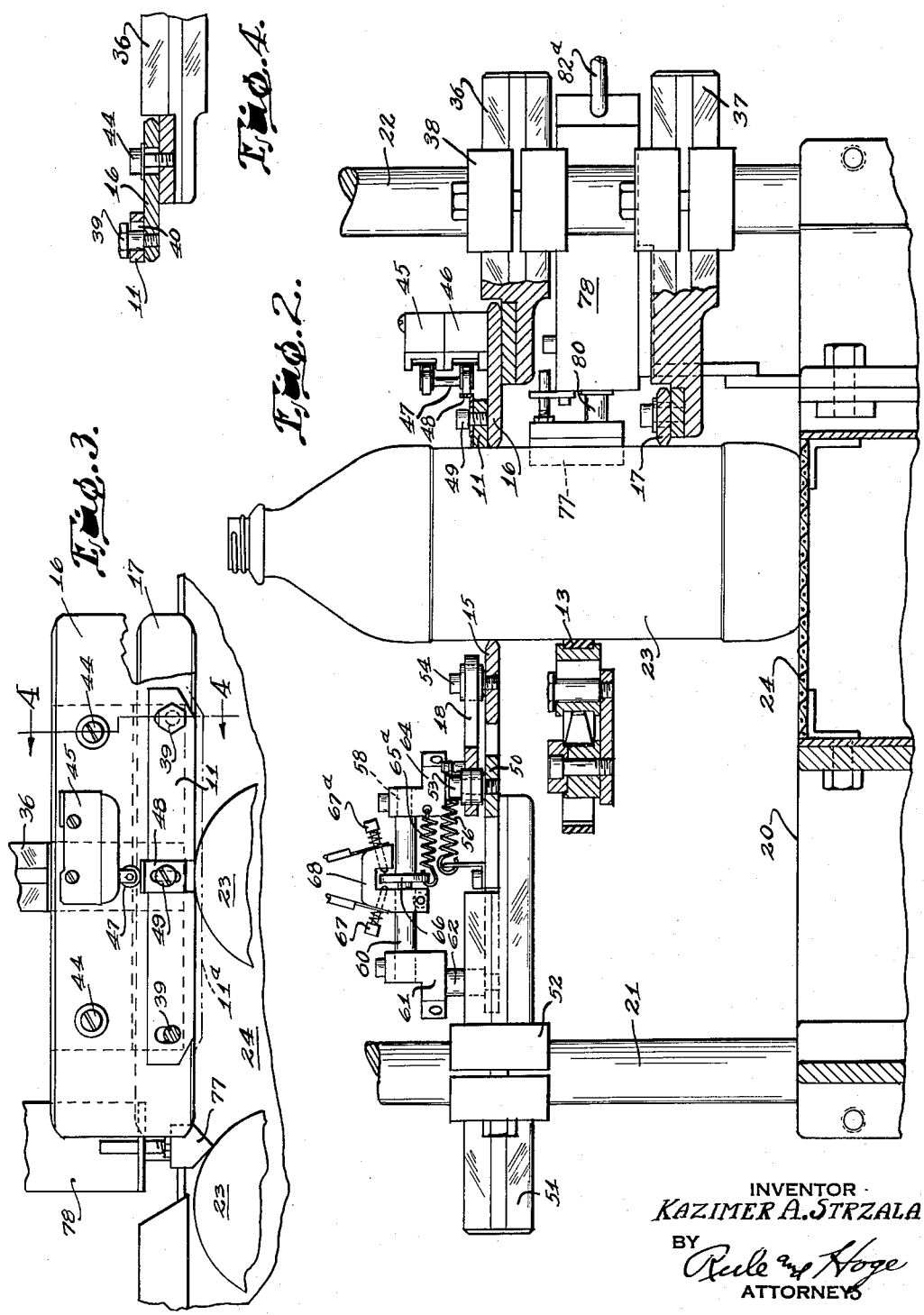

May 24, 1960 K. A. STRZALA 2,937,749
ARTICLE GAUGING AND SELECTING APPARATUS
Filed Dec. 19, 1956 5 Sheets-Sheet 3
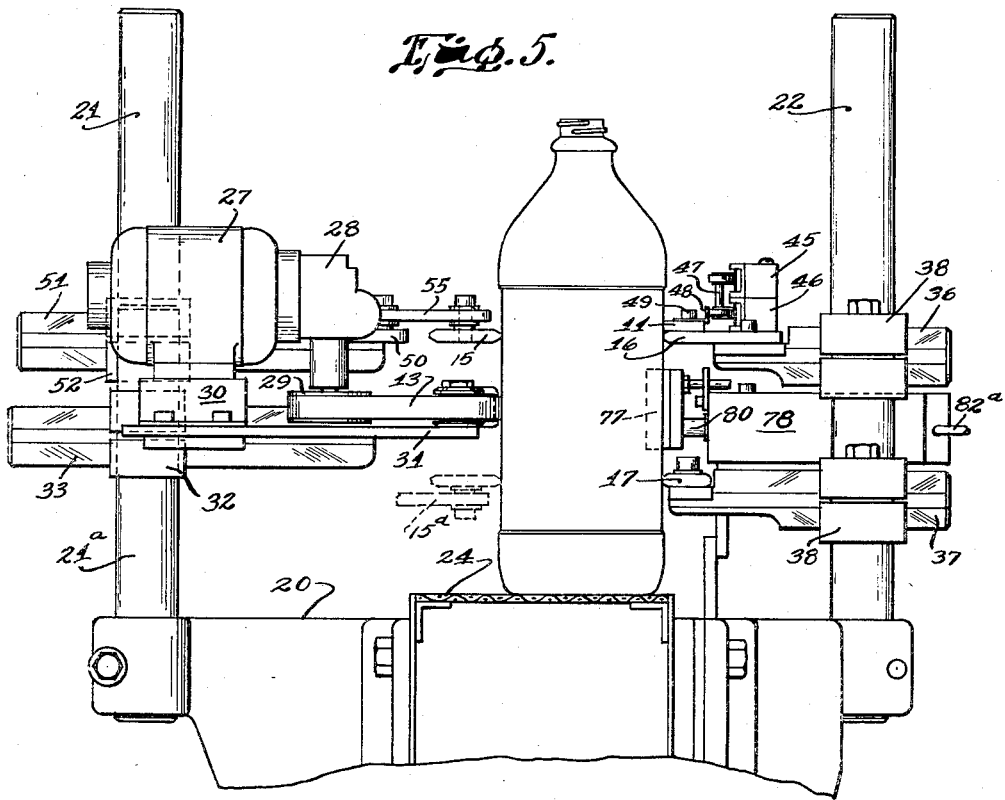
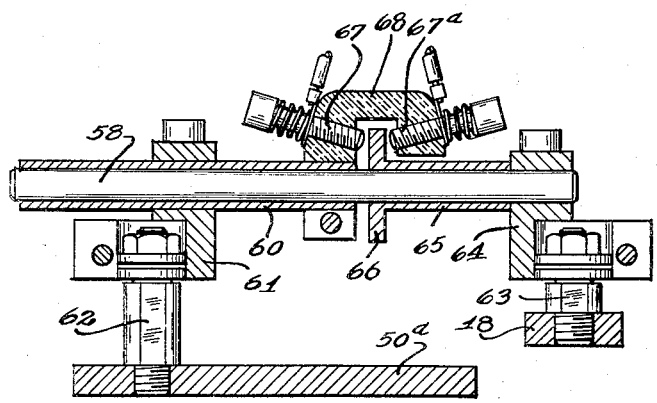
INVENTOR
KAZIMER A. STRZALA
BY
ATTORNEYS May 24, 1960

K. A. STRZALA 2,937,749

ARTICLE GAUGING AND SELECTING APPARATUS

Filed Dec. 19, 1956

INVENTOR
KAZIMER A. STRZALA
BY
Rule and Hoge
ATTORNEYS

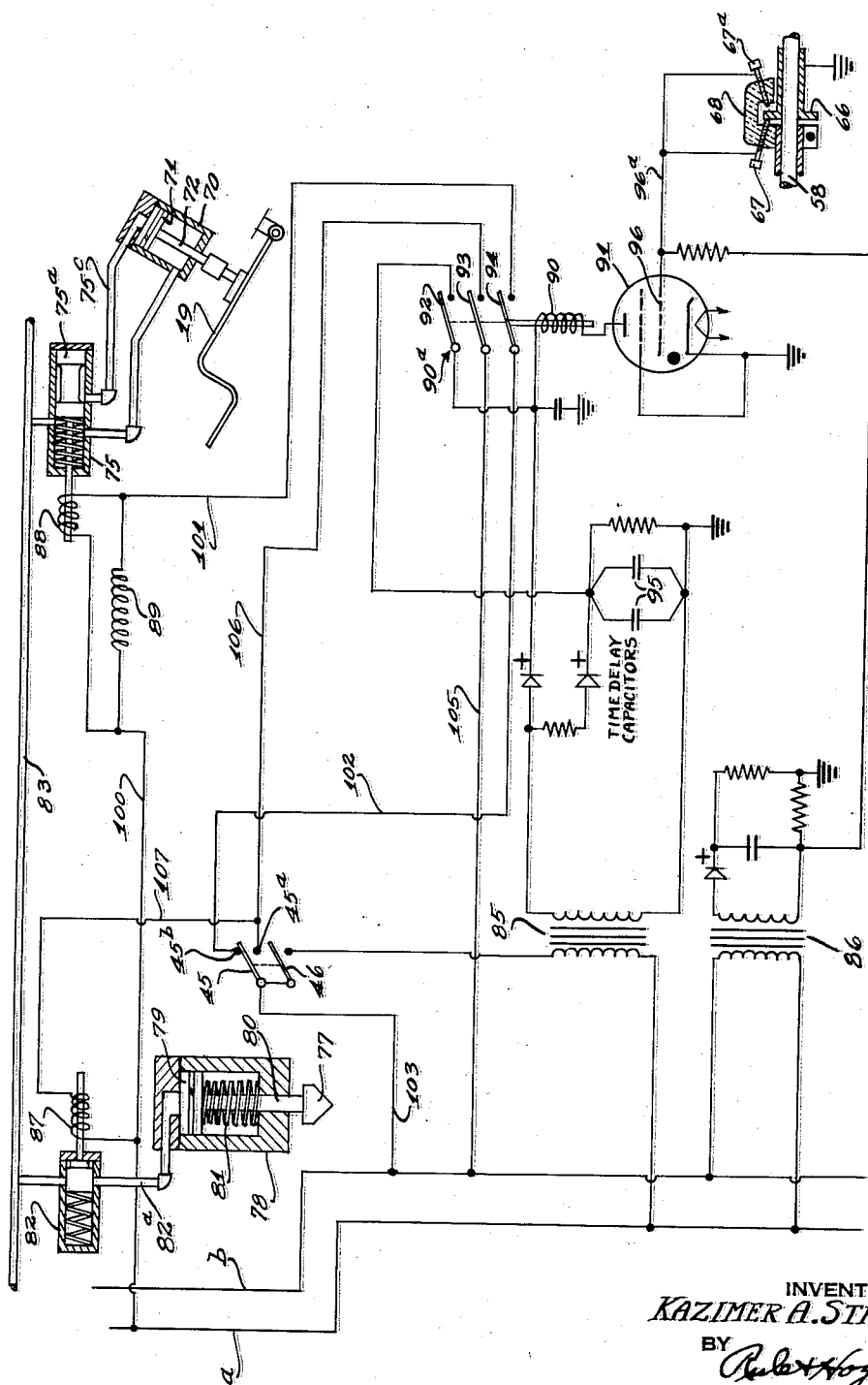

United States Patent Office 2,937,749
Patented May 24, 1960

2,937,749

ARTICLE GAUGING AND SELECTING APPARATUS

Kazimer A. Strzala, Walnut Creek, Calif., assignor to Owens-Illinois Glass Company, a corporation of Ohio Filed Dec. 19, 1956, Ser. No. 629,356

5 Claims. (Cl. 209—88)

My invention relates to apparatus for gauging the diameters of round articles or articles having cylindrical surface portions and testing such articles for detecting various defects or surface irregularities and segregating and discarding the articles which fail to meet the test. As an example of one of the various fields of uses in which the invention may be employed, I have herein illustrated and described the invention as adapted for use in testing round bottles and similar articles.

In the manufacture of glass containers such as bottles and jars by present day methods it is practically impossible to produce uniformly perfect ware in respect to size and shape. Defects in such ware include variations in diameter, bulges, sunken sides and other irregularities. The present invention provides apparatus designed for testing such articles as they are conveyed in succession through a testing zone and includes means for automatically detecting and segregating the defective articles from those that pass the test.

A preferred form of the apparatus as herein shown and described includes a continuously traveling horizontal conveyor by which the articles are carried in succession through the testing zone. During their travel through the testing zone they are rotated by a continuously running drive belt which engages one side of the cylindrical surface under test and holds the article against stationary back-up bars at the opposite side of the article and extending in the direction of travel. In this manner the articles are rolled along the back-up bars during the test. A cycle bar parallel with the back-up bars is operated by the pressure of the workpiece thereagainst to actuate electric switches in control circuits of the testing apparatus. A gauging bar held in contact with the workpiece as it rolls along the back-up bars has operating connections with electro-responsive means for indicating when the article under test is defective in respect to diameter or shape, and bringing into operation a reject mechanism for segregating the defective article from those that pass the test. While an article is within the testing zone the oncoming articles are prevented from entering the zone by a hold-back device which is projected into the path of the articles as by means of an air cylinder.

Referring to the accompanying drawings:

Fig. 1 is a plan view of an apparatus illustrating a preferred form of the invention;

Fig. 2 is a cross-sectional elevation on an enlarged scale at the line 2—2 on Fig. 1;

Fig. 3 is a fragmentary plan view on a comparatively large scale of certain parts shown in Fig. 1;

Fig. 4 is a section at the line 4—4 on Fig. 3;

Fig. 5 is a cross section as indicated by the line 5—5 on Fig. 1;

Fig. 6 is a section at the line 6—6 on Fig. 1;

Fig. 8 is a piping and electric wiring diagram.

Figure 7:
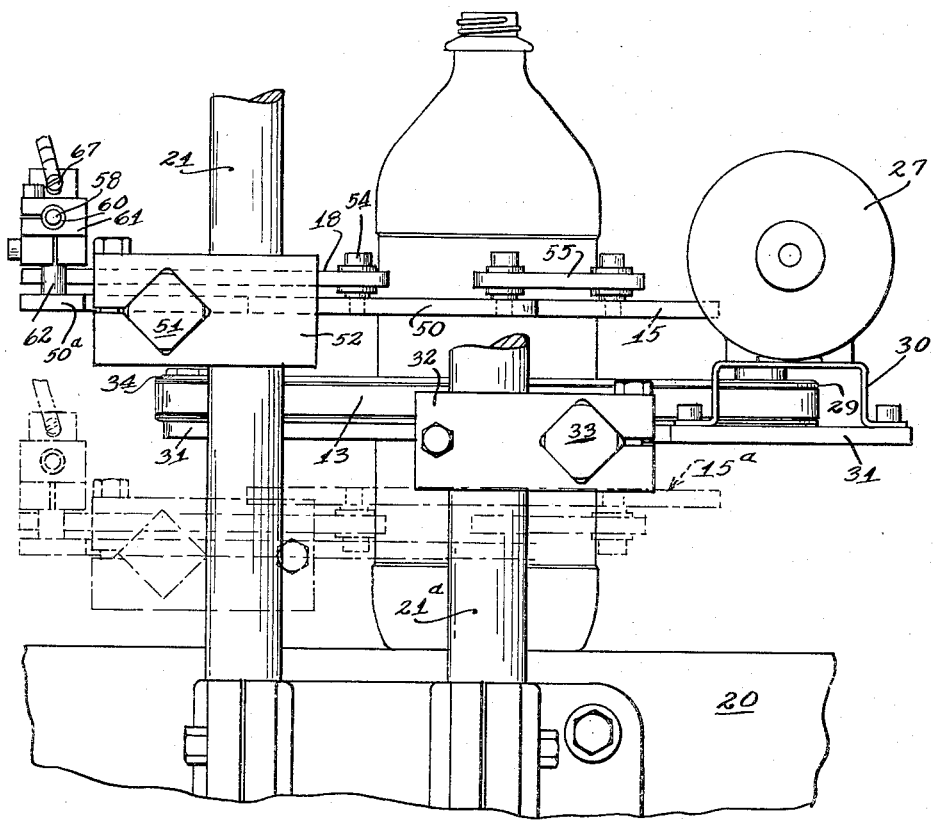
Fig. 7 is a fragmentary elevational view as indicated by the line 7—7 on Fig. 1.

Referring to the drawings, the testing apparatus is mounted on a framework 20 to which are secured stationary columns 21, 21a and 22 providing support for the testing apparatus. The articles 23 which are to be tested, here shown as bottles with cylindrical bodies, are carried in succession to the testing or gauging apparatus on a continuously traveling horizontal belt conveyor 24. When the articles enter the testing zone they are taken out of the control of the conveyor 24. Back-up bars 16 and 17 extend horizontally through the testing zone in position to contact the article under test while a continuously running drive belt 13 bears against the opposite side of the article and rolls it along the back-up bars. When the article passes beyond the control of the drive belt 13 it is carried on forward by the conveyor 24. If the article fails to pass the test it is automatically segregated from the remaining articles by a reject arm 19 operated as hereinafter described to move the article off the conveyor 24 on to a receiving device 25 which may be in the form of a platform, chute, conveyor, or the like.

The drive belt 13 is driven continuously by a motor 27 which has driving connection with the belt through the speed reduction gearing 28 and drive pulley 29. The motor is mounted by means of a bracket 30 on a platform 31. The motor is supported by the post 21a to which is clamped a block 32. An arm 33 adjustably mounted in the block 32 provides a support for the platform 31. The belt 13 is trained over the drive pulley 29, idler pulleys 34, and a tension and take-up pulley 35. When a bottle 23 enters the testing zone it is brought into contact with the belt 13 which then holds it against the upper and lower back-up bars 16 and 17 and rolls it along said bars. The pressure of the belt is sufficient to take the bottle out of the control of the conveyor 24 and roll the bottle forward at a speed determined by that of the drive belt.

The back-up bars 16 and 17 are mounted respectively on supporting arms 36 and 37 which are attached to the post 22 by clamping devices 38 which permit adjustment of the back-up bars individually to different heights.

A bar 11, herein referred to as the cycle bar, is mounted on the back-up bar 16 and is free for limited bodily movement toward and from the path of the bottles through the testing zone. Stud bolts 39 extending through elongated slots 40 in the cycle bar 11 provide means for attaching it to the bar 16 (Figs. 3 and 4) permitting free movement of the cycle bar. The back-up bar 16 is adjustably secured to the arm 36 (Fig. 4) by a clamping bolt 44 extending through an elongated slot in the bar 16. The lower back-up bar 17 is adjustably mounted in like manner.

Mounted on the back-up bar 16 are upper and lower switches or microswitches 45 and 46. A switch closing element 47 is operated by an angle plate 48 adjustably mounted on the cycle bar 11 and clamped in position by a screw 49. When the cycle bar 11 is in its inner position 11a (Fig. 3) shown in broken lines the microswitches 45, 46 are in open position (Fig. 8). When a bottle 23 enters the testing zone, the cycle bar is moved outwardly thereby to the full line position (Fig. 3) and operates through the contact element 47 to close the microswitches and hold them in closed position until the bottle runs off the cycle bar.

The cycle bar 11 is of a length at least equal to one-half the circumference of the largest article 23 which the apparatus is designed to gauge. The gauging bar 15 is mounted for bodily movement and remains parallel with the line of travel of the articles at all times owing to the parallel link connections between the bar and a stationary supporting plate 50. The plate 50 is carried on an arm 51 and adjustable thereon toward and from the path of the workpieces. The arm 51 is adjustably mounted and clamped in a split clamping block 52 which is clamped to the post 21 and adjustable up and down thereon.

The gauging arm 18 is connected by pivots 53 and 54 to the plate 50 and gauging bar 15. A link 55 also pivoted to the bar 15 and plate 50 provides with the gauging arm 18 a parallel link connection for the gauging bar. A coil tension spring 56 holds the gauging bar in contact with the rolling workpiece 23 throughout the gauging operation.

The gauging arm 18 is slidably connected with an electric contact device 57, shown in detail in Fig. 6, including a rod 58 mounted for lengthwise sliding movement and herein referred to as the slide. The rod 58 is free for sliding movement within a tubular rod 60 which is connected by a clamping bracket 61 and pivot bolt 62 to an extension 50ª of the plate 50. The gauge arm 18 has a pivotal connection with the slide, said connection including a pivot bolt 63 and connecting block 64, the latter fixed to the rod 58. A metal sleeve 65 is mounted on the rod 58 in fixed relation thereto, and formed with an electric contact disk 66. Electric contact elements 67 and 67ª, referred to as minimum and maximum contact screws respectively, are screw-threaded into a head or yoke 68 of insulating material shaped to straddle the contact disk 66 and clamped to the tube 60. When there is no bottle within the gauging zone, gauging bar 15 is moved inward by the spring 56 to a stop position in which the contact disk 66 is held against the minimum contact screw 67. While a bottle of normal dimensions is passing through the testing zone it holds the gauging bar in an intermediate position with the contact disk 66 spaced from both the contact screws 67 and 67ª. If the bottle under test is of either greater or smaller diameter than permissible or is misshapen in a manner to cause shifting of the gauging bar from such intermediate position, the disk 66 will contact one of the screws 67 or 67ª. A circuit is thereby established for a reject mechanism by which the defective article will be duly ejected from the conveyor 24 as hereinafter described.

The reject mechanism includes the reject arm 19 which as shown in full lines, Fig. 1, is normally in a retracted position outside of the path of the bottles. The arm 19 is moved by an air-operated piston motor 70 herein referred to as the reject cylinder. The motor comprises a piston 71 (Fig. 8), and piston rod 72. The latter is adjustably connected through a link 73 (Fig. 1) and block 74 to the reject arm 19 for adjustably varying the position of the arm 19 when projected over the conveyor 24 into the path of a defective article. The reject cylinder 70 is operated by air pressure under the control of a solenoid valve 75.

Means for holding back the oncoming bottles 23 while a bottle is within the testing zone, includes a hold-back stop 77 actuated by a piston motor 78 herein termed the hold-back cylinder. The motor comprises a piston 79 and piston rod 80 to which the stop 77 is attached. The stop 77 is held in its retracted position by a spring 81 except while a bottle is under test, during which time the stop is held in its projected position in the path of the bottles by air pressure supplied through a solenoid valve 82. Air under pressure is supplied to the solenoid valves 82 and 75 through a pressure line 83.

The electric control system as shown in Fig. 8 includes mains a and b connected to any suitable source of alternating current supply. Current is supplied from the mains to transformers 85 and 86 and to the various control devices including solenoid 87 for operating the valve 82, solenoid 88 for operating the valve 75, solenoid 89 for operating a counter and a relay solenoid 90 in the plate circuit of a thyratron 91. The solenoid 90 operates a relay switch 90ª comprising contact bars 92, 93 and 94. A time delay device comprising capacitors 95 serves to delay the operation of the reject cylinder when a defect is registered, until the article has advanced into the path of the reject arm, as presently described. A negative voltage is supplied through the transformer 86 to the control grid 96 of the thyratron, sufficient to normally prevent the tube from conducting.

Operation

With the machine in operation, the conveyor 24 and the driving belt 13 are running continuously. Assuming that there is no bottle within the testing zone, the cycle bar 11 is in its projected position (dotted line position, Fig. 1) so that the cycle switches 45 and 46 are in open position (Fig. 8). The circuit through the hold-back solenoid 87 is open at contact 45a so that air pressure through the line 82a is cut off and the hold-back stop 77 is in retracted position permitting an oncoming bottle 23 to enter the testing zone. The reject solenoid 88, controlling the reject arm 19, is in open circuit so that the reject arm is held in its retracted (full-line) position (Fig. 1). This reject circuit may be traced from the main a through lead 100, solenoid 88, lead 101, relay contact bar 94, lead 102, switch 45 and lead 103 to main b. The primary of transformer 85 is in open circuit so that the thyratron circuit receives no voltage.

The operation which takes place while a good bottle is passing through the testing zone will first be described. As the bottle enters this zone it is engaged by the continuously traveling drive belt 13 which then holds the bottle firmly in contact with the upper and lower back-up bars 16 and 17. The belt rolls the bottle along these bars, maintaining continuous contact of the bottle with the bars while being tested. As the bottle commences to roll or shortly thereafter it engages the gauging bar 15 and moves it outwardly to an intermediate position determined by the diameter of the bottle. As the bottle now under test is of normal diameter the gauging bar 15 is moved inwardly by the spring 56 to an intermediate position. This movement transmitted through the gauging arm 18 and slide 58 (Fig. 6), moves the contact disk 66 from its engagement with the minimum gauge contact 67 to an open position between the contacts 67 and 67ª and maintains the disk in open circuit position throughout the testing operation. This prevents operation of the reject mechanism as will presently be described. The bottle as it advances after reaching the gauging bar next engages the cycle bar 11, moving it outwardly and, through the switch closing element 47 closes the cycle switches 45, 46. Closing of the switch 45 at the normally open contact 45ª (Fig. 8) makes a circuit for the hold-back solenoid 87 which accordingly projects the valve piston to supply pressure from the line 83 through the valve and line 82ª to the hold-back cylinder, so that the stop 77 is projected and prevents another bottle entering the testing zone until the bottle under test has been discharged. The closing of the cycle switch 46 makes a circuit across the mains a, b for the transformer 85, thereby supplying voltage to the plate circuit of the thyratron 91. The thyratron, however, will not conduct at this time because a negative voltage supplied through the transformer 86 is applied to the control grid 96. The negative bias is sufficient to prevent the tube from firing. The solenoid 88 controlling the reject arm remains de-energized so that the reject arm remains in its retracted position.

When the bottle under test has passed beyond the cycle bar 11 the switches 45 and 46 are again opened so that the electrical control circuits are restored to the same conditions as before the bottle entered the testing zone. The bottle, as it passes beyond the control of the drive belt 13, is released to the control of the conveyor 24 which carries it away from the testing apparatus.

The operation when a defective bottle is passing through the testing zone will now be described. As such bottle enters the testing zone, it is brought between the driving belt 13 and the back-up bars 16 and 17, starts to roll and then contacts the gauging bar 15, all as above described in connection with the testing of a good bottle.

The cycle bar 11 is then operated to close the switches 45 and 46. Closing of the switch 45 makes the circuit for coil 87 and causes projection of the hold-back stop 77. Closing of the switch 46 supplies voltage through the transformer 85 to the thyratron plate circuit. The gauging bar 15 is positioned by the bottle under test and the latter being a defective bottle, will, at some point during its travel through the testing zone, bring the gauging bar into a position to effect operation of the reject mechanism. That is, the gauging bar 15 will operate through the arm 18 to move the contact disc 66 into engagement with either the maximum contact screw 67a if the diameter of the bottle is greater than a prescribed maximum, or into contact with the minimum contact screw 67 if the diameter is less than the prescribed minimum. In either event, the thyratron control grid 96 is grounded, being connected through wire 96a to the contact screws, the disc 66 being grounded.

Grounding of the control grid brings its voltage up to a point permitting the tube to fire. The relay solenoid 90, being in the plate circuit of the tube, now operates the relay 90a and moves the contact bars 92, 93, and 94 to closed position. The contact bar 94 as before noted is in the circuit of the reject solenoid 88, but the closing of the relay does not affect this solenoid as the circuit is open at the contact 45b and remains open until the cycle bar 11 has been released. Closing of the relay contact bar 93 completes a by-pass circuit through the hold-back solenoid 87, such circuit including a lead 105, contact bar 93, leads 106 and 107. The solenoid 87 therefore remains energized when the cycle switch 45 opens the circuit at contact with 45b so that the hold-back stop 77 is retained in its projected position until the gauging operation is completed. Closing of the relay contact bar 92 provides a circuit for the time delay capacitors 95, such circuit extending through the relay coil 90. The capacitors, however, remain charged by voltage supplied through the transformer 85 until the cycle switch 46 has been opened.

When the bottle under test releases the cycle bar, the cycle switches 45, 46 are returned to open position (Fig. 8). Opening of the switch 45 completes the by-pass circuit through the reject solenoid 88 so that the latter operates the valve 75, thus connecting the air pressure line 83 through pipe 75c to the reject cylinder so that the arm 19 is projected into the path of the defective bottle which has just been tested. By this time, the preceding bottle has advanced beyond the path of the arm 19. Opening of the switch 45 also opens the circuit for the hold-back solenoid 87 so that after contact bar 93 also has opened the valve 82 operates to cut off air pressure from cylinder 78 and causes hold-back stop 77 to be withdrawn, permitting the next succeeding bottle to enter the testing zone. Opening of the switch 46 in the primary circuit of transformer 85 cuts off the voltage supplied thereby to the thyratron. The capacitors 95 of the time delay device now discharge through the relay solenoid 90 so that the relay remains closed for a short time interval after the cycle bar has been withdrawn. This time interval of one-half second, more or less, permits the defective bottle to be brought into the path of the reject arm. The relay solenoid 90 being de-energized when the time delay capacitors have been discharged, the relay switch 90a opens. The relay contact bar 94 opens the circuit for the reject solenoid 88 so that the reject arm 19 is retracted, thereby moving the defective bottle off the conveyor 24 onto the discharge platform 25. Opening of the relay switch contact bar 93 in the by-pass circuit through the hold-back solenoid 87, permits the hold-back stop to be retracted. This completes the cycle.

As shown on the drawings, the gauging bar 15 is directly opposite the back-up bar 16, and theoretically will gauge the bottle at a single plane or line of circumference. However, it is found that the gauging practically is not so limited. Moreover, in practice, it is found that gauging at one height, or level, serves to indicate substantially all bottles defective in respect to diameter gauge. Moreover, defects such as bulges or sunken sides, which may be detected by the gauging apparatus, occur mostly at about the same height or position of the bottles, owing to methods of manufacture so that, in practice, a single gauging operation at one level is effective for detecting substantially all defective bottles. The gauging apparatus, being adjustable up and down, permits testing of the workpieces within the zone in which defects generally occur. If desired, a plurality of gauging or testing devices may be provided for simultaneously testing the bottles at different levels. Thus, as shown in broken lines in Fig. 7, a duplicate gauging bar and mechanism operated thereby are provided, permitting testing of the bottle at different levels concurrently. A single drive belt 13 serves for rotating the bottle while both gauging devices are in operation. Both gauging devices are operative through the same electrical control system for operating the reject arm 19 in the manner above described. As shown in broken lines in Fig. 5, a second gauging bar 15a is positioned directly opposite the back-up bar 17.

Modifications may be resorted to within the spirit and scope of my invention as defined in the appended claims.

I claim:

1. Apparatus for gauging round surfaces of articles, said apparatus comprising a traveling conveyor by which the articles are brought singly and in succession to a testing zone, a driving belt extending through said zone, a back-up bar extending through said zone, means for driving said belt and thereby rolling each article along the back-up bar during its passage through the testing zone, means for holding the back-up bar stationary while the articles are rolling therealong, a gauge bar extending through said zone, means for mounting the gauge bar in position to contact the article at a point diametrically opposite from the point of contact of the article with said back-up bar, means for yieldingly holding the gauge bar in sliding contact with the article passing through said zone, a reject mechanism, and an electrical control system including means actuated by said gauge bar for effecting the operation of said reject mechanism and thereby segregating defective articles from those that pass the test, said electrical control system including an electrical switch, means providing operating connections between the gauge bar and the switch for closing the switch when the diameter of the article under test is beyond a prescribed permissible range of diameters, means operable by the closing of said switch to effect operation of the reject mechanism, a cycle bar extending into the path of the article under test and movable by said article to a retracted position and maintained by the article in said position while the article is traversing the gauging zone, and means controlled by said cycle bar to prevent operation of the reject mechanism while the article under test is within the gauging zone.

2. Apparatus for gauging the diameters of round surfaces of articles, said apparatus comprising a traveling conveyor by which the articles are brought in succession to a testing zone, a drive belt extending through said zone, a motor geared to said belt and driving it in the direction of travel of the articles through said zone, a back-up bar extending through said zone and spaced from the driving belt to permit the passage of the articles between the back-up bar and drive belt, means for holding the drive belt against an article within said zone and thereby rolling the article along the back-up bar during its passage through the testing zone, a gauge arm extending through said zone parallel with the back-up bar, means for yieldingly mounting the gauge arm and holding it in yielding contact with the article under test at the side opposite the back-up arm, thereby causing movement of the gauge arm transversely to the direction of travel of the articles with variations in the diameter of the article under test, a reject mechanism, electro-responsive means for causing operation of the reject mechanism, an electrical control system comprising a switch in a control circuit for said electro-responsive means, and means providing operating connections between the gauge arm and said switch, the electrical control system comprising a cycle bar extending into the path of the article under test and moved thereby to a retracted position and held by the article in such position during the gauging of an article, a cycle switch operated by said cycle bar, and means in circuit with said cycle switch for controlling the operation of the reject mechanism and preventing such operation until the article under test has passed beyond the gauge arm.

3. The apparatus defined in claim 2, said reject mechanism comprising a fluid operated motor, a solenoid valve and solenoid controlling the operation of said motor, a reject arm operatively connected to the fluid operated motor and held thereby in retracted position out of the path of the said articles, the switch operated by the gauge arm being in a control circuit for the said solenoid, said cycle switch being in a control circuit for the said solenoid and thereby operated to prevent operation of the reject mechanism until the article under test has passed beyond the gauging zone.

4. The apparatus defined in claim 2, said electrical control system including a thyratron, a switch operated by the cycle bar controlling a voltage supply to the thyratron, a relay in the plate circuit of the thyratron, and means controlled by said relay for effecting operation of the reject mechanism.

5. The apparatus defined in claim 2, including a time delay device comprising capacitors in a circuit controlled by said relay, said capacitors operative to control the thyratron and cause it to conduct for a limited time after the operation of the relay, thereby delaying the operation of the reject mechanism.

References Cited in the file of this patent

UNITED STATES PATENTS

| | | |
|---|---|---|
| 2,352,091 | Fedorchak | June 20, 1944 |
| 2,353,748 | Nordquist | July 18, 1944 |
| 2,368,796 | Ardell | Feb. 6, 1945 |
| 2,407,062 | Darrah | Sept. 3, 1946 |
| 2,592,260 | Emerson et al. | Apr. 8, 1952 |
| 2,741,365 | Box et al. | Apr. 10, 1956 |